(12) United States Patent
Pillai et al.

(10) Patent No.: US 8,090,801 B1
(45) Date of Patent: Jan. 3, 2012

(54) METHODS AND APPARATUS FOR PERFORMING REMOTE ACCESS COMMANDS BETWEEN NODES

(75) Inventors: Pazhani Pillai, Billerica, MA (US);
Daniel R. Cassiday, Topsfield, MA (US); Don M. Morrier, Hudson, NH (US); John R. Feehrer, Westford, MA (US)

(73) Assignee: Oracle America, Inc., Redwood City, CA (US)

( * ) Notice: Subject to any disclaimer, the term of this patent is extended or adjusted under 35 U.S.C. 154(b) by 1651 days.

(21) Appl. No.: 10/767,182

(22) Filed: Jan. 29, 2004

Related U.S. Application Data

(60) Provisional application No. 60/509,338, filed on Oct. 7, 2003.

(51) Int. Cl.
*G06F 15/16* (2006.01)
*G06F 15/173* (2006.01)
*G06F 9/46* (2006.01)

(52) U.S. Cl. ........ 709/219; 709/217; 709/242; 709/249; 709/250; 718/108

(58) Field of Classification Search .............. 709/217, 709/219, 242, 249, 250; 718/108
See application file for complete search history.

(56) References Cited

U.S. PATENT DOCUMENTS

| | | | |
|---|---|---|---|
| 6,252,600 B1 * | 6/2001 | Kohli et al. .................. | 345/419 |
| 6,581,086 B1 * | 6/2003 | Morrison et al. ............ | 708/523 |
| 6,601,148 B2 * | 7/2003 | Beukema et al. ............ | 711/153 |
| 6,832,297 B2 * | 12/2004 | Pfister et al. ................. | 711/144 |
| 6,904,507 B2 * | 6/2005 | Gil .............................. | 711/170 |
| 6,961,801 B1 * | 11/2005 | Frink ........................... | 710/308 |
| 2002/0026502 A1 * | 2/2002 | Phillips et al. .............. | 709/219 |
| 2003/0018828 A1 * | 1/2003 | Craddock et al. ........... | 709/321 |
| 2003/0204552 A1 * | 10/2003 | Zuberi ......................... | 709/103 |
| 2003/0204679 A1 * | 10/2003 | Blankenship ................ | 711/146 |

(Continued)

OTHER PUBLICATIONS

Turner et al. An Approach for Congestion Control in Infiniband. May 14, 2002. http://www.hpl.hp.com/techreports/2001/HPL-2001-277R1.pdf.*

*Primary Examiner* — Hieu Hoang
(74) *Attorney, Agent, or Firm* — Brooks Kushman P.C.

(57) ABSTRACT

A system, methods and apparatus perform remote access commands between nodes and allow preemption of context resources in an architecture such as Infiniband. The system detects an original request in a request queue for a data access task to access data from a first node to a second node and issues a first request from a first node to a second node. The first request requests the data access task be performed between the first node and the second node. The system receives, at the first node, a first response from the second node that partially completes the data access task. The system issues at least one subsidiary request from the first node to the second node to further complete the data access task between the first node and the second node. The subsidiary request(s) are based on an amount of partial completion of the data access task between the first node and the second node. The system receives, from the second node in response to the subsidiary request, at least one corresponding subsidiary response that further completes the data access task between the first node and the second node. Reponses are limited in size to a data allotment, such that a large data access request may be broken into several smaller subsidiary data access request response sequences, thus allowing preemption of context resources in between processing of request response pairs.

16 Claims, 6 Drawing Sheets

U.S. PATENT DOCUMENTS

| | | | |
|---|---|---|---|
| 2003/0220983 A1* | 11/2003 | Hui | 709/219 |
| 2004/0030757 A1* | 2/2004 | Pandya | 709/217 |
| 2004/0037319 A1* | 2/2004 | Pandya | 370/469 |
| 2004/0049580 A1* | 3/2004 | Boyd et al. | 709/226 |
| 2004/0117368 A1* | 6/2004 | Saha et al. | 707/6 |
| 2004/0117375 A1* | 6/2004 | Saha et al. | 707/10 |
| 2004/0122987 A1* | 6/2004 | Henry et al. | 710/5 |
| 2004/0252709 A1* | 12/2004 | Fineberg | 370/412 |
| 2005/0204058 A1* | 9/2005 | Philbrick et al. | 709/238 |

* cited by examiner

METHODS AND APPARATUS FOR PERFORMING REMOTE ACCESS COMMANDS BETWEEN NODES

CLAIM TO BENEFIT OF EARLIER FILED PROVISIONAL APPLICATIONS

This Utility Patent Application claims the benefit of the filing date of the following filed and U.S. Provisional Patent Application: "METHODS AND APPARATUS FOR PERFORMING REMOTE ACCESS COMMANDS BETWEEN NODES" filed Oct. 7, 2003 having U.S. Ser. No. 60/509,338

This utility Patent Application shares co-inventorship with the above-identified Provisional Patent Application and is assigned to the same assignee as this Provisional. The entire teachings and contents of the above-referenced Provisional Patent Application is hereby incorporated herein by reference in its entirety.

BACKGROUND

Conventional computerized devices such as personal computer systems, workstations, or the like require the ability to transmit data between components within, and attached to such computerized devices at very high rates of speed. As an example, consider a typical conventional workstation containing one or more processors, one or more memory systems and possibly a variety of peripheral input output components such as storage devices (e.g., floppy disks, hard disks, CD-ROM drives, etc.), network interface connections (e.g., modems or Ethernet network interface cards), video display devices, audio input output devices (e.g., soundcards), instrumentation adapters and so forth. A conventional data bus that interconnects such components within the computer system allows the components to exchange data with each other (e.g., read and/or write data) and also allows one component, such as a processor, to control operation of another component such as a memory system or a video display card. Generally, a conventional data bus or interconnection architecture includes a collection of communications hardware such as a network interface card or microprocessor, ports, adapters, physical data links and/or connections that couple various devices or components within the computer system. Such conventional interconnect architectures also include software or firmware processes (e.g., embedded programs) that operate one or more input output data communications protocols or signaling mechanisms to control communications over the interconnected communications hardware and data links coupled via the data bus.

One type of conventional data bus that computer and device designers utilize to interconnect and allow components within a computer system to communicate is called a Peripheral Component Interconnect (PCI) bus. A PCI bus implements a shared bus architecture that allows a processor such as a central processing unit (CPU) operating within the computer system to control or arbitrate access to the PCI bus by components that need to transmit data on the bus. The PCI bus architecture operates at a preset or predefined speed (e.g., 100-Mhz) and forces a component on the PCI bus to share the total available bus bandwidth using various bus arbitration algorithms when communicating with another component. While the PCI bus approach is acceptable for use in many computing system environments, use of a PCI bus to exchange data between components in the computer system can encounter signal integrity and timing constraints that can limit the total speed available for communications between computerized device components. In addition, a conventional PCI bus is fixed in physical size (e.g., 32 bits, 64 bits, 128 bits) and does not scale well to allow for the addition of numerous other components or devices onto the bus beyond a number of available bus interface hardware connections or "slots" that a system designer initially provides in the computer system. Due to such limitations and to increasing performance requirements of modern day computer applications, computer engineers have developed another type of expandable data bus or interconnect architecture called Infiniband.

Infiniband is a conventional, industry standard, channel-based, switched fabric interconnect architecture designed for use in computer systems such as servers and peripherals devices such as storage devices, network interconnects, memory systems, and the like to allow high speed data access between such devices. A conventional Infiniband architecture operates much like a computer network in that each component, peripheral or device that operates in (i.e., that communicates over) the Infiniband architecture or network is equipped with an Infiniband channel adapter that operates as a network interface card to provide input output (I/O) onto one or more Infiniband communications channels or data links (i.e., physical links). The data links can be coupled to Infiniband switches or can directly couple to other Infiniband adapters. There is no limit to the number or types of components that may be coupled to the Infiniband fabric. Each Infiniband equipped component is generally referred to as a "node" and Infiniband nodes communicate using "channel adapters" coupled via point to point serial connections through Infiniband switches or routers that collectively form the Infiniband fabric. Host channel adapters (HCAs) are capable of interfacing with data communications applications in an operating system to couple servers or workstations as nodes to the Infiniband fabric. Target channel adapters (TCAs) exist within input output devices such as storage systems or other peripheral device nodes and can communicate with host channel adapters.

The Infiniband architecture supports multiple data paths between nodes thus providing for redundancy, congestion control and high data transfer rates. Current conventional Infiniband supports a 2.5 Gbps wire-speed connection in each direction on each wire and allows three different performance levels (1×, 4× and 12×) that correspond to three different possible physical connectivity characteristics between the channel adapters. For the 1× performance level which is the lowest performance available in Infiniband, there is one physical data link, wire or connection between adapters (for the total single wire bandwidth of 2.5 Gbps in each direction), whereas the 4× performance level provides four physical parallel links between adapters (for a total bandwidth of 12 Gbps in each direction), and the 12× performance level provides twelve physical parallel links between adapters (for a total bandwidth of 30 Gbps in each direction).

When transferring a block of data from one device to another using conventional communications protocols, latency arises in the form of overhead and delays that are added to the time needed to transfer the actual data. The major contributors to latency of a data transfer operation are the overhead of executing network protocol code within the operating system, context switches to move in and out of an operating system kernel mode to receive and send out the data, and excessive copying of data between user level buffers and memory within a network interface card that initially receives or transmits the data.

Infiniband uses packet communications to transfer data access commands between nodes and provides mechanisms that result in significant latency reduction as compared to other conventional data bus or interconnect architectures.

Both host and target Infiniband channel adapters present an interface to layers of software and/or hardware above them that allow those upper layers to generate and consume packets directly. Since the Infiniband architecture is designed for use across high-bandwidth links that have very high reliability, Infiniband significantly eliminates processing requirements such as special case network protocol code that introduce latency into communications. As a result, the Infiniband protocol is defined to avoid operating system kernel mode interaction and interrupts during data transfers thus allowing for direct memory access (DMA) to the channel adapter memory from user mode applications. Because of the direct access to the adapter, Infiniband avoids unnecessary copying of the data into kernel buffers since the user is able to directly access data from user-space via the channel adapter. In addition to the standard send/receive operations that are typically available in a networking protocol, Infiniband provides Remote Direct Memory Access (RDMA) operations such as Read and Write where the initiator node of the operation specifies both the source and destination of a data transfer, resulting in zero-copy data transfers with minimum involvement of the main processors in a node.

Specifically, in order for an application to communicate with another application over InfiniBand, the application must first create a work or request queue that consists of a queue pair (QP) for sending and receiving data (i.e., a send queue and a receive queue). In order for the application to execute a data access operation such as an RDMA read or RDMA write operation to another node, it must place a work queue element (WQE) in the work queue. From there, the Infiniband channel adapter operates a scheduler that picks up the work queue element operation for execution. Therefore, the work queue forms the communications medium or interface between user applications and the channel adapter, relieving the operating system from having to deal with this responsibility.

Each application process may create one or more QPs for communications purposes with another application on other nodes. Instead of having to arbitrate for the use of the single queue for a conventional network interface card as in a typical operating system that uses a PCI bus, for example, Infiniband has multiple queues called queue pairs. To service the queue pairs in conventional Infiniband, one or more contexts may be used to process the work queue elements in those queue pairs. Generally, a context defines context resources (e.g., processing resources and other associated queue pair and work queue element state information) used to process work queue elements that appear in queue pairs. In conventional Infiniband, when a work queue element appears in a queue pair, a scheduler in the channel adapter assigns a context (i.e., a set of channel adapter resources) to process that work queue element to full completion of the data transfer task, and thereafter can reassign those context resources to process another work queue element of another queue pair for another data transfer task. Queue pairs and associated context resources can be implemented in hardware within a channel adapter, thereby off-loading most of the work required for data transfers from the CPU. Once a work queue element has completed the data transfer, the context may place a completion queue element (CQE) in a completion queue to notify the user application that the data transfer operation is complete and that the application can now access memory to retrieve the results of the operation. Once the queue pair element has been processed to completion, the context is free to be reassigned to another queue pair. The advantage of using the completion queue for notifying the caller of completed work queue elements is because it reduces the interrupts that would be otherwise generated to the operating system.

The list of remote access commands or operations supported by the conventional InfiniBand architecture at the transport level for Send Queues are as follows:

1. Send/Receive: supports a typical send/receive operation where one node submits a message and another node receives that message. One difference between the implementation of the send/receive operation under the InfiniBand architecture and more traditional networking protocols is that InfiniBand defines the send/receive operations as operating against queue pairs.
2. RDMA-Write: this operation permits one node to write data directly into a memory buffer on a remote node. The remote node must of course have given appropriate access privileges to the node ahead of time and must have memory buffers already registered for remote access.
3. RDMA-Read: this operation permits one node to read data directly from the memory buffer of a remote node. The remote node must of course have given appropriate access privileges to the read requesting node ahead of time.
4. RDMA Atomics: this operation name actually refers to two different operations that have the same effect but which operate different from one another. The Compare & Swap operation allows a node to read a memory location and if its value is equal to a specified value, then a new value is written in that memory location. The Fetch Add atomic operation reads a value and returns it to the caller and then adds a specified number to that value and saves it back at the same address.

For the conventional Infiniband Receive Queue, the only type of operation currently supported is:

1. Post Receive Buffer: identifies a buffer into which a client may receive data from an incoming send operation.

SUMMARY

Conventional techniques and mechanisms for performing remote access commands between nodes such as those discussed above using conventional implementations data bus architectures such as Infiniband suffer from a variety of deficiencies. In particular, conventional Infiniband end nodes or channel adapters have a feature of supporting RDMA transfers that can be as large as two (2) Gigabytes (GB) in size. One node can thus write or read data in two GB increments to or from memory within a remote node over the Infiniband fabric. Such large memory access operations can have a significant negative impact on fairness and quality of service with respect to user applications that interface to conventional Infiniband channel adapters in nodes that are executing such large data transfers. Due to the time required to receive responses to such large transfers and for prolonged allocation of channel adapter context resources to receive such large blocks of memory at any instant (e.g., in response to a read request), conventional Infiniband implementations adversely effect the performance of other applications that must wait for such transaction to complete before releasing context resources to perform other data access operations of a much smaller size.

As a specific example, a typical conventional Infiniband node can execute an RDMA read request to read up to two GB of memory from a remote node. As explained above, conventional Infiniband implementations allow a user application to directly read this large block of remote node memory by creating an RDMA Read request work queue element. The RDMA read request identifies the source and destination node addresses for the request packet, the starting address at which to begin reading the remote node memory, and the size of the read request (2 GB in this example). When a scheduler in a conventional channel adapter assigns a context to the queue pair to execute this RDMA read request work queue element, the context issues the RDMA read request by sending the request to the remote node over the Infiniband fabric. The remote node may begin responding and transferring the two GB of data at any time back to the request node. The responding node may wait a portion of time to respond due to various factors such as congestion. As such, the Infiniband channel adapter that originated the request reserves or holds context and associated resources in the requesting node in order to accommodate receipt of the forthcoming response. This means that the context in the channel adapter is allocated while awaiting receipt of the data from the remote node. If several applications in the same node provide work queue requests asking for read access to such large blocks of remote memory from the same or from different nodes, the requesting node (i.e., the contexts in the channel adapter of the node providing the RDMA read requests) must hold context resources while waiting for each entire block of data to be returned from the remote nodes for each outstanding RDMA read request. For large data access requests that may take some time to complete (e.g., 2 GB RDMA Read requests), this can tie up context resources for an unacceptable amount of time in both the requesting and responding node and can impact the performance of other applications awaiting completion of these and/or other possibly smaller data requests.

Embodiments of the invention are based in part on the observation that large data transfers that take place using interconnect architectures such as Infiniband suffer performance issues due to pre-allocation of context resources to process incoming data in response to data transfers such as RDMA read requests. Embodiments of the invention significantly overcome this problem and provide mechanisms and techniques that perform remote access commands between nodes in an interconnect architecture such as Infiniband in a manner that promotes fairness and quality of service concerns. Embodiments of the invention avoid a requirement of allocating context resources until transfer of the total amount of the large data transfer requested by an original data transfer request is complete. To do so, embodiments of the invention operate in a communications interface, such as an Infiniband channel adapter, to detect an initial or application request such as, for example, an RDMA read request for 2 GB of data in a request queue. The system of the invention completes this application request, as will be explained in detail, using a series of subsidiary requests and corresponding subsidiary responses that are limited in size to a pre-agreed upon data allotment that indicates or sets the maximum amount of data allow to be transferred between nodes within a single response to a data transfer request.

As an example, according to embodiments of the invention, two nodes, such as nodes within an Infiniband fabric, may establish or setup a mutually pre-agreed upon (e.g., preconfigured) data allotment to be, for example, 20 kilobytes in size. The data allotment indicates the maximum amount of data that can be sent in a response to a request between nodes. Using this pre-agreed upon data allotment, to perform remote access commands between nodes, the first or requesting node can detect an application request in a request queue (e.g., a work queue entry in an Infiniband queue pair) that identifies a data access task such as an RDMA read request indicating that a first or requesting node wants to read a large amount of data, such as 2 GB, within memory in a second or responding node. The first node can then issue a first request to the second node that identifies or requests the data access task (i.e., RDMA read 2 GB) to be performed between the first node and the second node. In other words, the first request can request the entire amount of the data transfer to be performed between the first and second nodes. In response to the first request, the first node receives a first response from the second node that only partially completes the data access task. In particular, since the first and second node have agreed to the preset data allotment as a maximum, preset or capped amount of data to be used when transferring portions of data between the nodes, assuming the application request specifies a data access task that requests more data than the amount specified by the pre-agreed upon data allotment (e.g., a request >20 KB), the second node produces the first response that only contains as much data as the pre-agreed upon data allotment (e.g., the first response only contains the first 20 KB of the 2 GB of requested data) and thus only partially completes the original data access task.

In order to fully complete the data access task, the first node then issues at least one (e.g., one or more) subsidiary request from the first node to the second node to further complete the data access task between the first node and the second node. Each subsidiary request is based on an amount of partial completion of the data access task between the first node and the second node up to the current point in time. In one embodiment, this can be the summation of all data received from each of the first and all subsidiary request and response sequences processed thus far for the application request. That is, in response to each subsidiary request, the first node receives a corresponding subsidiary response that further completes the data access task between the first node and the second node by transferring a portion of data no greater in size than the pre-agreed data allotment. The first node continues to repeat issuing subsidiary requests and receiving corresponding subsidiary responses until the data access task is totally complete between the first and second nodes. Each subsidiary response is limited in size to the predetermined data allotment agreed-upon between the two nodes, such as the 20 kilobytes in this example. The context resources receiving this response operate a task manager provided by embodiments of this invention that tracks an offset into the originally requested data in order to calculate a new starting value for the next subsidiary request. In other words, the task manager tracks how much data has been transferred using the subsidiary request and response transfers up to the current point in time. In this manner, the original application RDMA read request specifying the two GB to read from the remote node is completed using a series of subsidiary requests and 20 KB subsidiary responses, with each request asking for either the next 20 KB block (in which case the task manger tracks how much data remains to be accessed).

Since embodiments of the invention operate in a communications interface to break up an application request such as a large Infiniband RDMA read request into a series of subsidiary requests each serviced by a much smaller subsidiary response returning only a portion of the request total amount of data, the first node is only required to reserve context resources for receipt of the first response and for receipt of each subsidiary response during the time it takes to receive the subsidiary response for a particular subsidiary request. After that subsidiary request response sequence is complete, if need be, the context resources used to services that request/response pair can be pre-empted for use in servicing another data access task for another queue pair.

In addition to only requiring reservation or allocation of context resources in the first node during transfer of data equal to the data allotment size that supports partial completion of the original data access task, embodiments of the invention treat each subsidiary request and each subsidiary response pair as a separate transaction and can allow preemption of the context resources used to support the subsidiary data transfer sequences. Embodiments of the invention thus allow pre-emption of context resources after completion of any request and response pair to use those context resources to handle other data access requests. This preemption of context resources can take place prior to full completion of the original data access task requested in the application request (which is completed over time by the collective set of request/response sequence pairs required to fully transfer all of the request data in increments limited by the data allotment).

In particular, one embodiment of the invention pre-empts the context resources in the first node for receipt of the first response and/or for receipt of subsidiary response(s) prior to full completion of the original or initial data access task (i.e., the entire data access task specified by the initial application request received in a request queue) and can thus issue a second request (i.e., obtained from another request queue) from the first node using the pre-empted context resources. The second request from another request queue can be a different type of data access request than the first request (e.g., can be another Infiniband command, such as a write command) and can be, but does not have to be, issued from the first node to a different node than the second node. In preferred embodiments, the pre-empted context resources can service data access requests from a queue pair other than the queue pair that contained the data access request for which the context resource were preempted (i.e., during processing of the subsidiary request and response sequences). In this manner, a large data access task such as a request to transfer 2 GB of memory does not tie up context resources in a node for the entire time it takes to transfer the entire requests amount of data since embodiments of the invention break this original data access task into a series of requests serviced by smaller responses and the context resources used to handle these request response pairs can be preempted to service other requests from the first node to other nodes.

To this end, embodiments of the invention promote fairness and maintain higher qualities of services between applications competing for Infiniband resources. In implementations that are hardware based, there may be a limited number of context resources but a large number of queue pairs with work queue entries (WQE's) to be serviced. As such, by being able to periodically preempt these context resources for use in servicing other work requests for other request queues (e.g., other queue pairs) prior to total completion of the large data transfer task, large data transfers no longer significantly adversely impact the overall performance of other processes relying on processing of queued application requests.

During the processing briefly explained above, in one embodiment of the invention, issuing subsidiary requests comprises a task manager in the context that calculates a remaining amount of data required to complete the data access task between the first node and the second node. This can include determining a total completed amount of data processed for the data access task by the first request and associated first response and all subsidiary requests and corresponding subsidiary responses between the first and second node up to the current pointing time for the data access task associated with one application request. From the total amount of data transferred so far, embodiments of the invention can determine the remaining amount of data required to complete the data access task as a difference between an initial amount of data (e.g., 2 GB) specified by the application request and the total completed amount of data up to the current time. Using this information, embodiments of the invention can create and issue each subsidiary request to reference (i.e., to obtain) at least a portion of the remaining amount of data (or all of the data, if less than data than the data allotment remains) required to complete the data access task. Each response can be limited by the data allotment.

In one embodiment of the invention, the first and second nodes are Infiniband nodes that utilize Infiniband channel adapters to exchange the first request and the subsidiary requests and the corresponding first response and the subsidiary responses. In addition, the application request is a remote direct memory access request, such as an RDMA read request, for the first node to access (e.g., read) data in a memory at the second node and the initial amount of data specified by the application request is a total amount of data that the first node is to access in the memory at the second node.

Other embodiments of the invention include a computerized device such as a channel adapter (e.g., an Infiniband channel adapter) and/or a workstation, handheld or laptop computer or the like configured with software and/or circuitry (e.g., a processor as summarized above) to process any or all of the method operations disclosed herein as embodiments of the invention. Still other embodiments of the invention include software programs to perform the method embodiment steps and operations summarized above and disclosed in detail below. One such embodiment comprises a computer program product that has a computer-readable medium including computer program logic encoded thereon that, when performed in a computerized device such as an Infiniband channel adapter having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device (e.g., an ASIC in an Infiniband channel adapter card) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, network interface cards, channel adapters and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
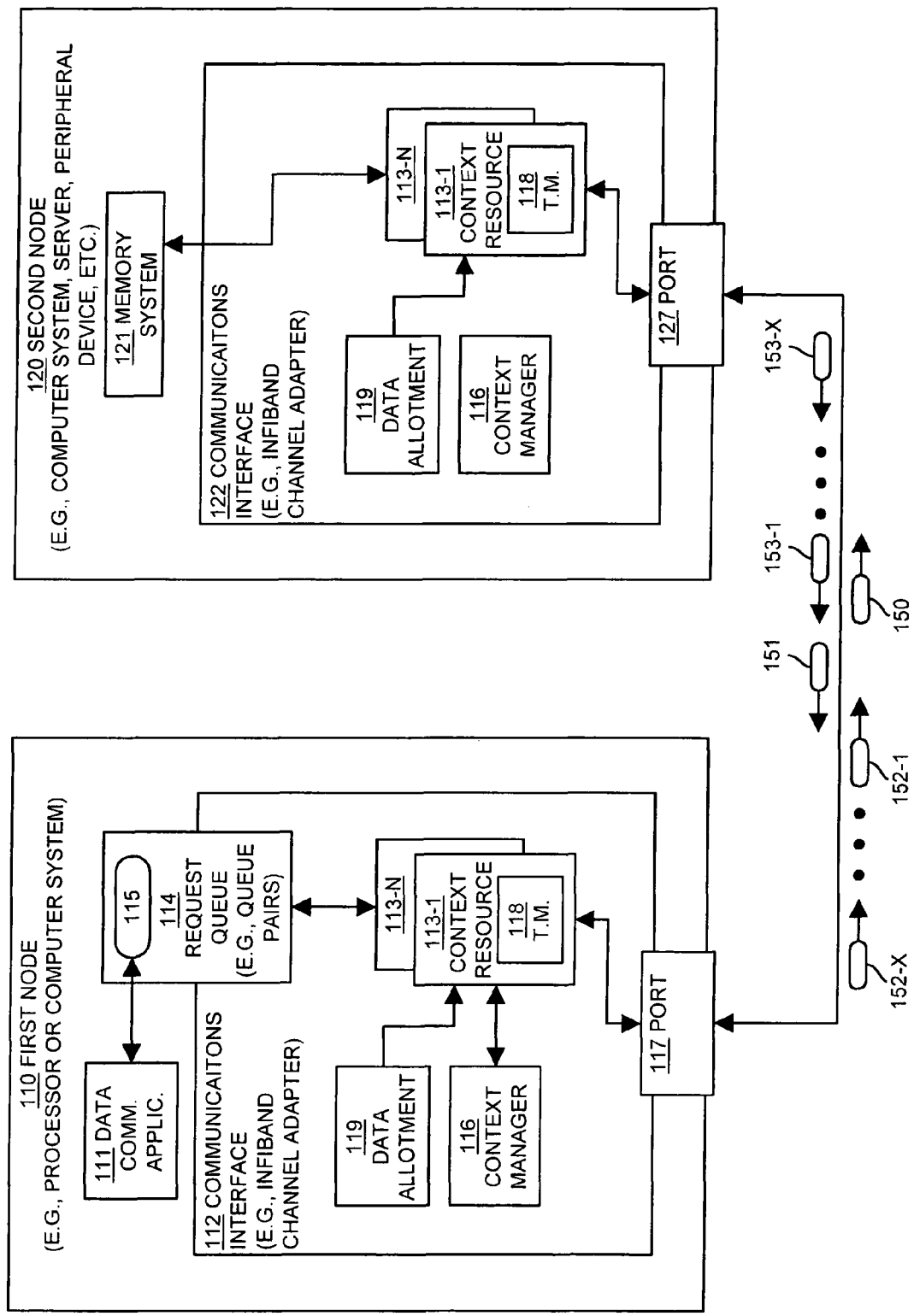
FIG. 1 illustrates a computer system environment including a first and second node performing a data access task according to one example embodiment of the invention.

FIG. 1 illustrates an example interconnection environment 100 suitable for use in explaining example operations of embodiments of the invention. The example interconnection environment 100 includes an interconnection 102 of first and second nodes 110 and 120. The first node 110 operates a data communications application 111 that utilizes a communications interface 112 to exchange data over the interconnection 102 with a communications interface 122 operating within the second node 120. The communications interface 112 in the first node 110 includes one or more request queues 114-1 through 114-M, one or more context resources 113-1 through 113-N, a context manager 116, a data allotment 119 and a communications interface port 117 that couples to the interconnection 102. In this example, the second node 120 includes a memory system 121 and a communications interface 122 configured in a manner similar in nature to the communications interface 119 in the first node 110. The communications interface 122 includes a data allotment 119 capable of storing a value indicating an amount of data that can be transferred in response(s) 153 to requests 150, 152 for data from other nodes. It is to be understood that the architecture of the second node 120 is similar to that of the first node 110 in this example.

The interconnection 102 can be an Infiniband fabric and the first and second nodes 110 and 120 can be, for example, computerized devices of any type, such as two host computer systems (e.g., servers or processor boards) or a host computer system and a target device such as a data storage system. The communications interfaces 112 and 122 can be Infiniband channel adapters that couple the first and second nodes 110 and 120. Within the first node 120, the request queues 114 can be, for example, Infiniband queue pairs and the context resources 113 represent Infiniband channel adapter transport context resources that the context manager 116 schedules and allocates for servicing of initial requests 115 (e.g., RDMA read requests for access to data in the memory system 121 in the second node 120) that appear within the request queues 114 for communications over communications interface port 117 with other devices on the interconnection fabric 102, such as the second node 120 (and for servicing the corresponding responses 163 to those requests). That is, in this example the communications interface 112 is an Infiniband channel adapter that implements an Infiniband communications stack in which request queues 114 representing queue pairs are serviced by context resources 113 for processing of requests 115 that represent, for example, work queue entries within queue pairs. Note that only one request 115 in one request queue 114 is shown in the example in FIG. 1 for simplicity. It is to be understood that there may be many request queues 114, each containing many requests 115 that each specify respective data access tasks such as read and write requests for data in other nodes.

According to this example embodiment of the invention, during initialization processing of the communications interfaces 112 and 122 operating within the first and second nodes 110 and 120, communications interfaces 112 and 122 are configured with an equivalent value for the data allotments 119. As an example, according to embodiments of the invention, the two nodes 110 and 120 can establish or set the pre-agreed upon data allotment value 119 to be, for example, twenty (20) kilobytes in size. Other sizes could be used as well and in one embodiment, each node 110 and 120 could use a different sized data allotment, or alternatively, each queue pair request queue 114 can have an associated data allotment 119 (e.g., application specific data allotment). However, in this example embodiment each node 110 and 120 agrees to and/or is configured with a common value for the data allotment 119.

Generally, the data allotment values 119 define a maximum amount of data to be used when transferring portions of data between nodes 110 and 120. The values for the data allotments 119 may be pre-agreed upon between the nodes 110 and 120 and can either be statically configured 130 once upon initialization of the communications interfaces 112 and 122 or can be dynamically adjusted or determined during operation of nodes 110 and 120, as will be explained. The communications interfaces 112 and 122 can access the value within the data allotment 119 to determine maximum sizes of data transfers (e.g., responses 151 and 153) that can take place between nodes 110 and 120 over the interconnection 102. In particular, within the communications interface 112 operating in the first node 110, each of the context resources 113 in the first node 110 operates a task manager 118 that can access the value within the data allotment 119 to determine maximum sizes of responses 151 and 153 to data transfer requests 150 and 152 (e.g, a series of RMDA read requests) that may take place between the first and second node 110 and 120. Further details of operation of embodiments of the invention as shown in FIG. 1 will now be explained with respect to the flow chart of processing steps shown in FIG. 2.

Figure 2:
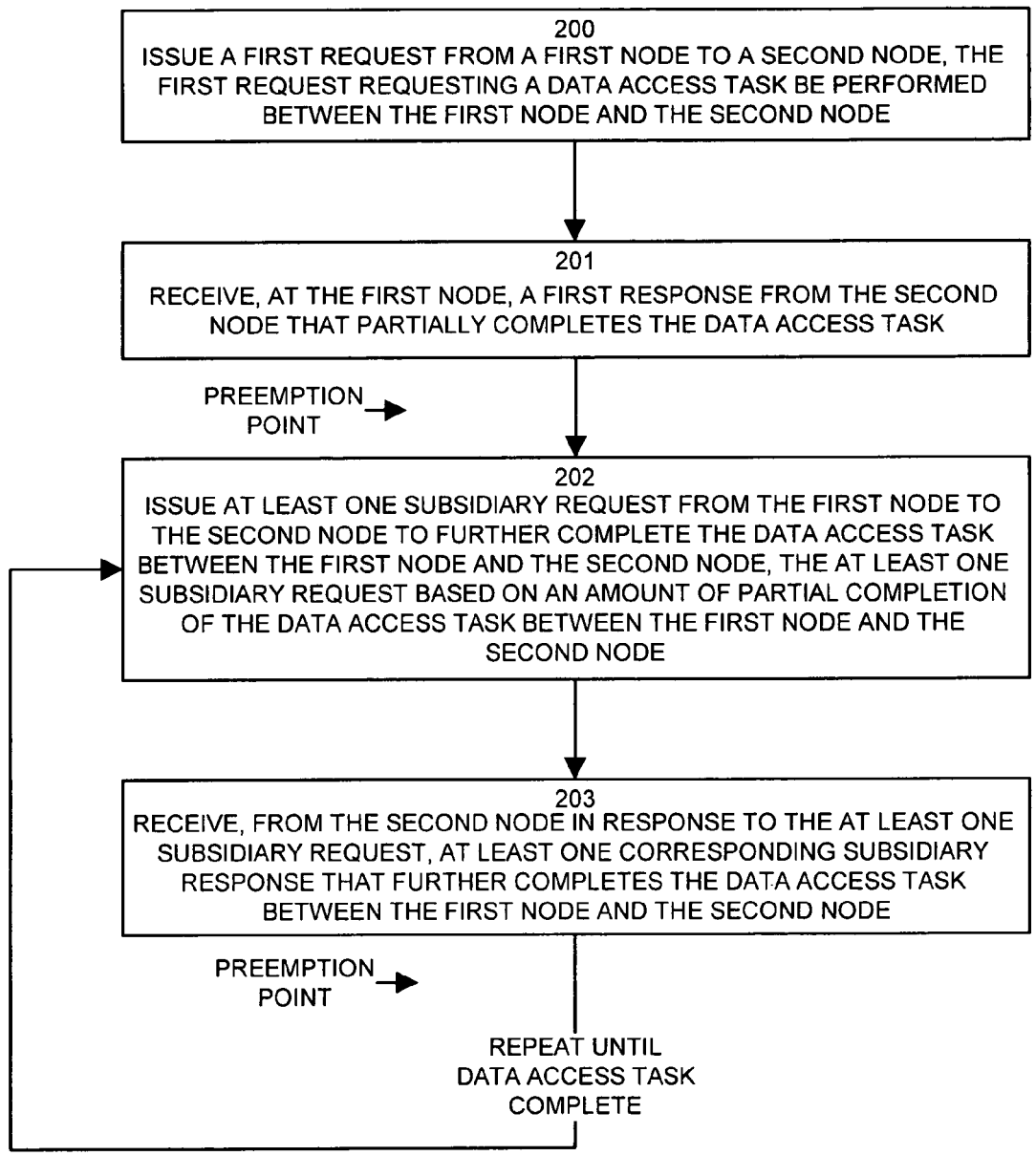
FIG. 2 is a flow chart of processing steps to perform remote access commands between nodes in accordance with one example embodiment of the invention.

FIG. 2 is a flow chart of processing steps performed by both the first node 110 to allow the first node 110 to perform a data access task with the second node 110. In this example, the data access task is specified in the initial request 115 and is an Infiniband RDMA read request, though the principles of the invention can be applied to other types of data access requests as well.

In this example, assume the data communications application 111 in the first node 110 requires the ability to perform a data access task with the second node 120. As an example, the data communications application 111 may require the ability to perform a remote direct memory access commands to read the memory system 121 within the second node 120. To perform such a remote access command between the nodes 110 and 120, the data communications application 111 in the first or requesting node 110 can place an original, initial or application request 115 in the request queue 114. The application request 115 may be an Infiniband work queue entry 115 that the data communications application 111 places into an Infiniband queue pair 114 (e.g., into a send queue) associated with or instantiated in the channel adapter 112 by the data communications application 111. Specifically, in this example, the application request identifies a data access task such as an RDMA read request 115 indicating that the data communications application 111 in the first node 110 wants to read a large amount of data, such as 2 GB, within the memory 121 in the second or responding node 120. At some point thereafter, the context manager 116 schedules a context resource 113-1 in the communications interface 112 to service the application request 115 in the request queue 114-1.

In step 200 in FIG. 2, the context resource 113-1 in first node 110 issues a first request 150 over the port 117 and interconnection fabric 102 to the second node 120. The first request 150 requests or identifies that a data access task (i.e., RDMA read 2 GB of memory 121 beginning at a specific address) be performed between the first node 110 and the second node 120. In this example, the first request 150 can request the entire amount of the data transfer (e.g., 2 GB) to be performed between the first and second nodes as specified by the application request 115.

In response to the first request 150, the communications interface 122 operating in the second node 120 receives the first request 150 and services this request to access data within the memory system 121 and provides a first response 151 that is limited in size to (i.e., does not exceed) the pre-agreed upon value (i.e., maximum amount of data allowed in a single data transfer) specified by the data allotment 119. That is, even though the first request 150 requested an RDMA read operation to read an entire 2 GB block of the memory 121 in the second node 120 in this example, the communications interface 122 in the second node 120 configured in accordance with embodiments of the invention uses the value of the data allotment 119 to limit or restrict the size of a response 151 to the first request 150 to a maximum value. Using the example value above, if the values of the data allotments 119 are both set to 20 kilobytes, the first response 151 only contains the first 20 kilobytes of the total request 2 GB of data, even though the first request 150 requested a transfer of the entire 2 GB of data from the memory system 121.

Next, in step 201, the first node 110 (i.e., the task manager 118 in the context resource 113 that sent the first request 150) receives a first response 151 from the second node 120 that only partially completes the data access task (i.e., read 2 GB of memory 121) specified by the application request 115. In particular, since the first and second node 110 and 120 have agreed to the preset data allotment 119 as a maximum amount of data to be used when transferring portions of data between the nodes, assuming the initial application request 115 specifies a data access task that requests more data than the amount specified by the data allotment (e.g., a request >20 KB), the second node 120 produces the first response 151 in step 202 that only contains as much data as the data allotment 119 (e.g., the first response only contains the first 20 KB of data) and thus only partially completes the data access task (i.e., reading the entire 2 GB). As will be explained, the task manger 118 in the context resource 118 tracks the amount of data received by all requests 150 associated with a data access task specified by an application request 115. Since in embodiments of the invention, responses to large data access requests are limited in size to a data allotment maximum value, such that a large data access request (e.g., 2 GB) may be broken into several smaller subsidiary data access request response sequences, thus allowing preemption of context resources in between processing of request response pairs, as will be explained further.

In step 202, assuming for this example that the requested data is larger than the value or size specified by the data allotment 119, the first node 110 issues at least one subsidiary request 152-1 through 152-X from the first node 110 to the second node 120 to further complete the data access task between the first node and the second node. In one embodiment, each iteration of step 202 causes the first node to issue only one subsidiary request 152 and then await receipt of a corresponding subsidiary response 153. The subsidiary requests 152-1 through 152-X request access to data in the memory 121 in the second node 120 in an amount based on a current amount of partial completion of the data access task between the first node 110 and the second node 120 for all requests (e.g., first request 150, and any subsidiary requests 152) and responses (e.g., first response 151, and any subsidiary responses 153) completed thus far. That is, in order to fully complete the initial data access task (i.e., specified in the initial request 115), the first node 110 issues one or more subsidiary requests 152 from the first node to the second node that request access to the memory 121 at a point or address in memory where the prior response 153 (i.e., the former response 153-X) left off.

As noted above, in one embodiment, the first node issues each subsidiary request 152 and awaits for a corresponding subsidiary response 153 prior to issuing another subsidiary request 152 for the same data access task associated with the same application request 115. In this manner, after the context resource 113 processes each response 153, there is an opportunity for the context manager 116 to pre-empt that context resource 113 from processing the next subsidiary request 152 and awaiting a response 153 associated with the initial request 115 (that specified the original large data access request) so that those context resources can be used to service requests in other requests queues 115. In this manner, a large request is broken up in to several request response sequence pairs, and Infiniband context resources do not need to be allocated for the entire amount of time it takes to transfer the whole amount of data specified for access in the initial request 115. This allows limited context resources 113 in the nodes to be used to service other queues, as opposed to tying up those context resources 113 for the total time it may take to complete the entire data access task.

To continue with the example explained thus far, the first request and response sequence 150 and 151 cause the context resource 113 to receive the first 20 KB of data from the memory 121. The task manager 118 in the context resources 113 that received this response tracks this amount of data and calculates content (e.g., a beginning data value) for the next (i.e., a subsidiary) request 152 to request data in the memory system 121 beginning at a 20 KB offset into the fully-sized target data buffer (e.g., 2 GB) as specified by the data access task in the application request 115. Accordingly, each subsidiary request 152-1 through 152-X requests an amount of data that is based on an amount of partial completion of the data access task between the first node and the second node up to the current point in time (i.e., taking into account a summation of all data received in both the first response 151 and all subsidiary responses 153-1 through 163-X that the task manager 118 has tracked as being received thus far by the first node 110).

The communications interface 122 operating in the second node 120 receives the subsidiary request 152-1 and services this request to access data within the memory system 121 and provides a subsidiary response 153-1 that is limited in size to the pre-agreed upon value specified by the data allotment 119, just as it did for the first request 150. Accordingly, the subsidiary response 153-1 transfers the next 20 KB of data (of the entire block specified by the data access task in the initial request 115) from the second node 120 to the first node 110. Note that the task manager 118 associated with the context resource servicing a particular queue pair (i.e., request queue 114) can account for packet loss accordingly by tracking amounts of data transferred thus far for collective set of subsidiary requests and responses.

In step 203, in response to the subsidiary request 152 (i.e., 152-1 on the first iteration of steps 202 and 203), the context resource 113 in the first node 110 receives a corresponding subsidiary response 153 (i.e., 153-1 for the subsidiary request 152-1) that further completes the data access task specified by the application request 115 between the first node 110 and the second node 120. Again, the task manager 118 operating in the context 113 tracks the total amount of data transferred so far for the total number of request and response sequences that have completed for the initial request 115 of that request queue 114.

The first node 110 continues to repeat issuing subsidiary requests in step 202 and receiving corresponding subsidiary responses in step 203 until the data access task specified by the application request 115 (i.e., access 2 GB of data from the memory 121) is totally complete between the first and second nodes 110 and 120. Each subsidiary response 153 is limited in size to the predetermined data allotment 119 agreed-upon between the two nodes, such as the 20 kilobytes in this example. In this manner, the application request 115 specifying the 2 GB data access task is completed using a series of subsidiary requests 152-1 through 152-X and corresponding 20 KB subsidiary responses 153-1 through 153-X.

Since embodiments of the invention break up the application request 115 specifying the large data access task into a series of a first request 150 and response 151 and one or more subsidiary requests 152 each serviced by a subsidiary response 153 containing data limited in amount to the data allotment 119, the communications interface 112 in the first node 110 is only required to allocate context resources for receipt of the first response 151 and for receipt of each subsidiary response 153 for support of responses containing data in an amount not exceeding the pre-agreed upon data allotment 119, 129. In other words, if the data allotment is 20 KB, embodiments of the invention in the first node 110 reserve and utilize context resources 113 to support processing 20 KB responses 151, 153 from the second node 120. Since such responses are limited in size, the context resources 113 are only briefly needed to support receipt of the 20 KB of data, and the context manager 116 can pre-empt those context resources 113, if need be, to service other request queues 114. This avoids a requirement as present in conventional Infiniband implementations of having to allocate or reserve the use of context resources for a period of time required to service an entire forthcoming (e.g., 2 GB) response to a large RDMA read request.

Figure 3:
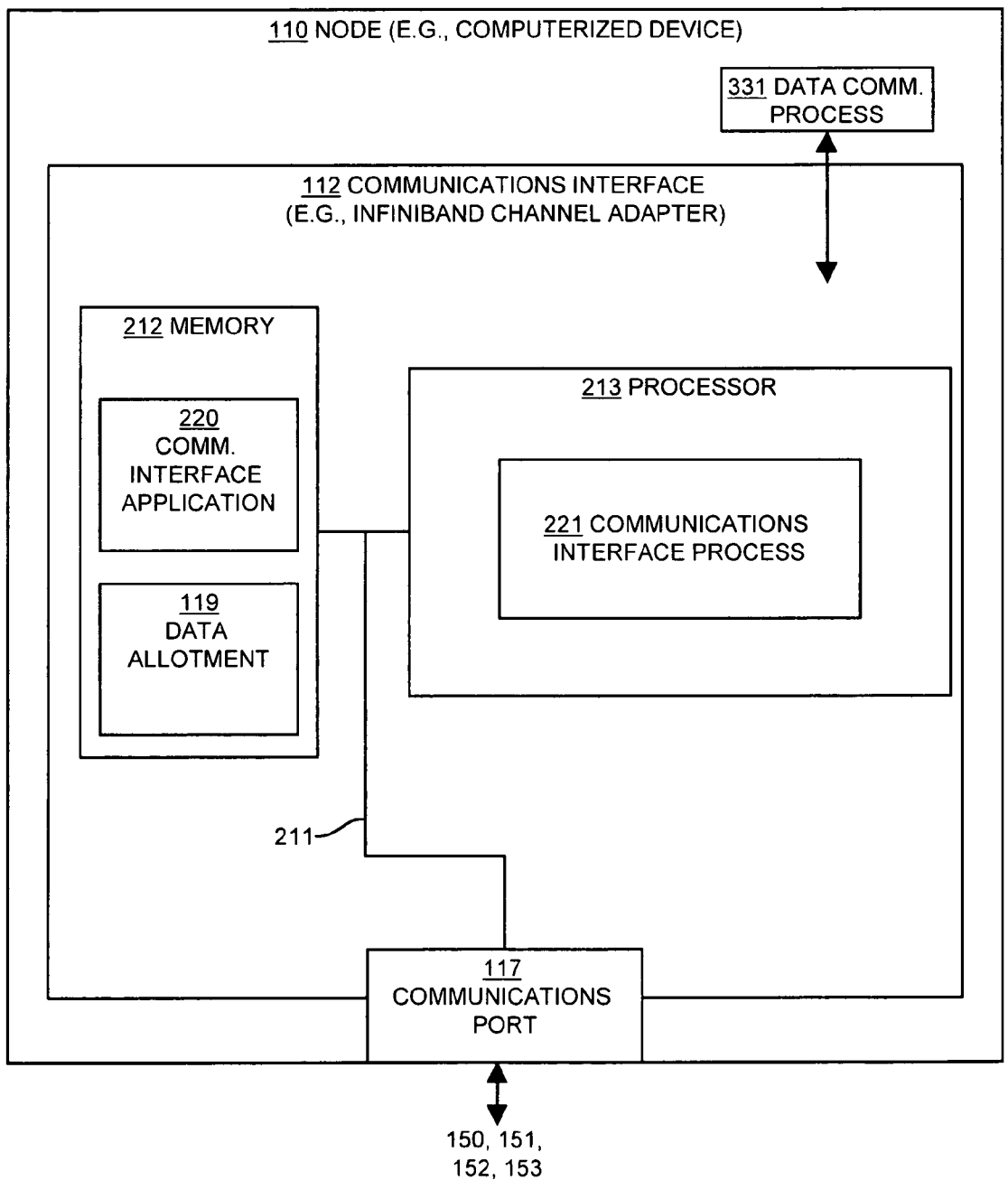
FIG. 3 illustrates a more detailed architecture of a node such as a computerized device including a communications interface configured to operate in accordance with one example embodiment of the invention.

FIG. 3 illustrates a more detailed architecture of a communications interface within a node 110 configured in accordance with embodiments of the invention. In this example, the communications interface 112 (e.g., an Infiniband channel adapter) includes an interconnection mechanism 211 such as a data bus, circuitry, board, or other hardware that couples a memory 212, a processor 213 and a communications port 117 (e.g., an Infiniband port). The processor 213 operates a communications interface process 221 that in this example provides the ability to perform data communications using the Infiniband interconnect architecture over the communications port 117 using one or more available actual physical connection links in the interconnection 102 (FIG. 1) that couple the communications port 117 to other Infiniband adapter devices 122 in other nodes 120 or to devices such as an Infiniband switch (not shown in this example).

The memory 212 is any type of computer readable medium such as semiconductor memory (volatile or non-volatile) or another type of storage media such as magnetic storage media (e.g., magnetic disk media that may be removable) or optical storage media). The memory 212 is encoded with data, logic instructions or other information that form a communications interface application 220. In other words, the communications interface application 220 in this example embodiment of the invention represents software code or logic instructions configured to carry out operations of embodiments of the invention as explained herein and includes the functionality of the context resources 113 each containing a task manager 118, the context manager 116 and the request queues 114 as explained above with respect to FIG. 1. It is also to be understood that some or all of this logic and these data structures (e.g., request queue pairs 114) can be configured in both hardware, software or any combination thereof).

The processor 213 represents any type of controller, microprocessor, central processing unit, circuitry or other hardware that is capable of accessing the memory 212 over the interconnection mechanism 211. Doing so allows the processor 213 to execute, run, interpret, load or otherwise perform the communications interface application 220 in order to produce or form the communications interface process 221. In other words, the communications interface process 221 represents a run-time instantiation of the communications interface application 220. It is to be understood that in this example embodiment, the communications interface application 220 and the communications interface process 221 each represent embodiments of the processing within the communications interface 112 in the first node 110 as illustrated in FIG. 1.

As such, it is to be understood that the invention can be implemented in hardware, software or a combination thereof, and that hardware or software operating according to the invention (e.g., in a runtime environment performing communications) are considered embodiments of the invention, as is software or hardware configured to operate in such a manner as explained herein, but not presently doing so (e.g., an Infiniband channel adapter card configured with processing capability as explained herein but to which no power is currently applied). In addition, software code encoded on a computer readable medium such as the memory 212, that is not actually executing, but that is executed on a process would carry out the processing explained herein is also considered an embodiment of this invention.

Figure 4:
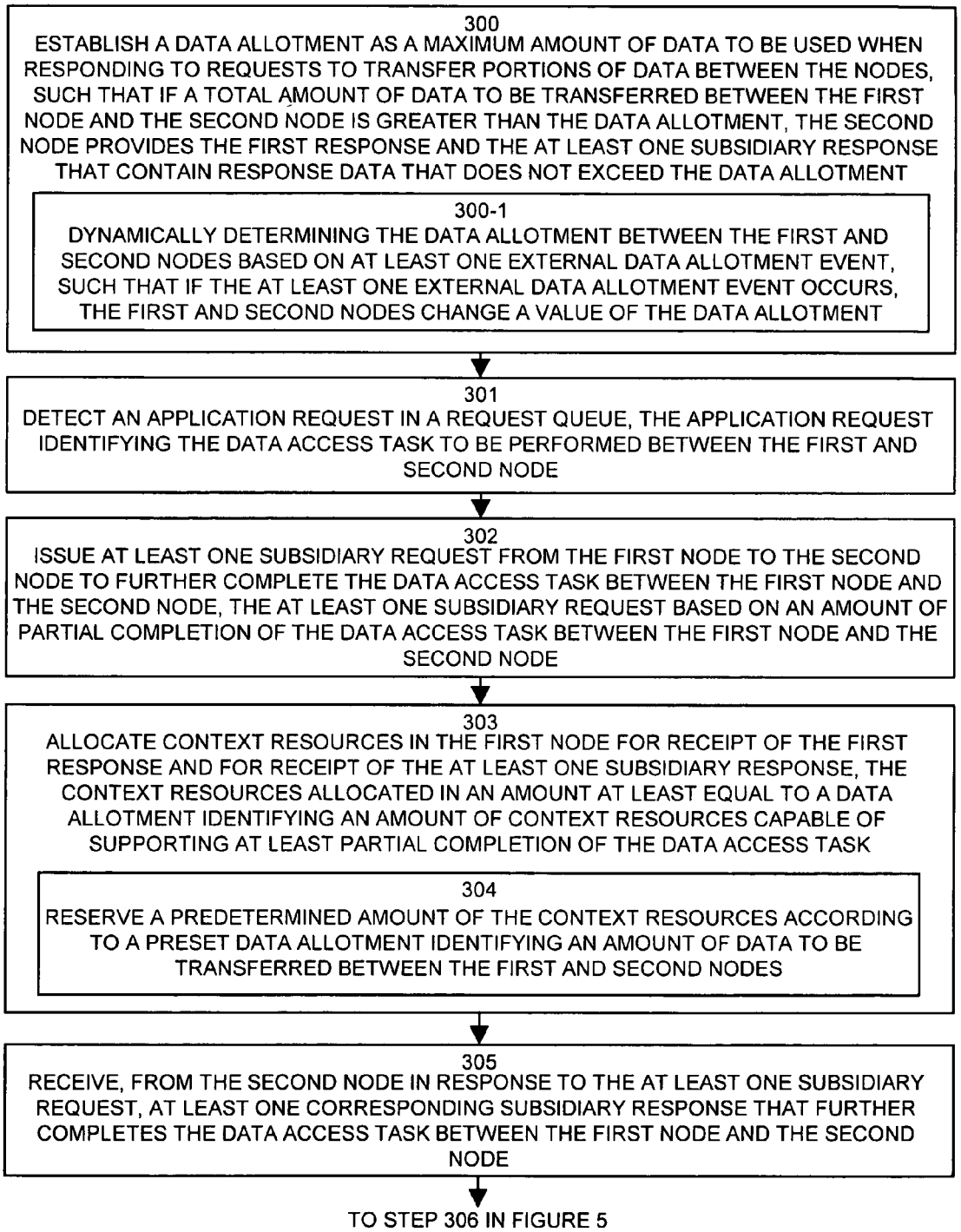
FIGS. 4 through 6 are a flow chart of processing operations performed by a node to process data access tasks associated with application requests for access to data in another node in accordance with example embodiments of the invention.
Figure 5:
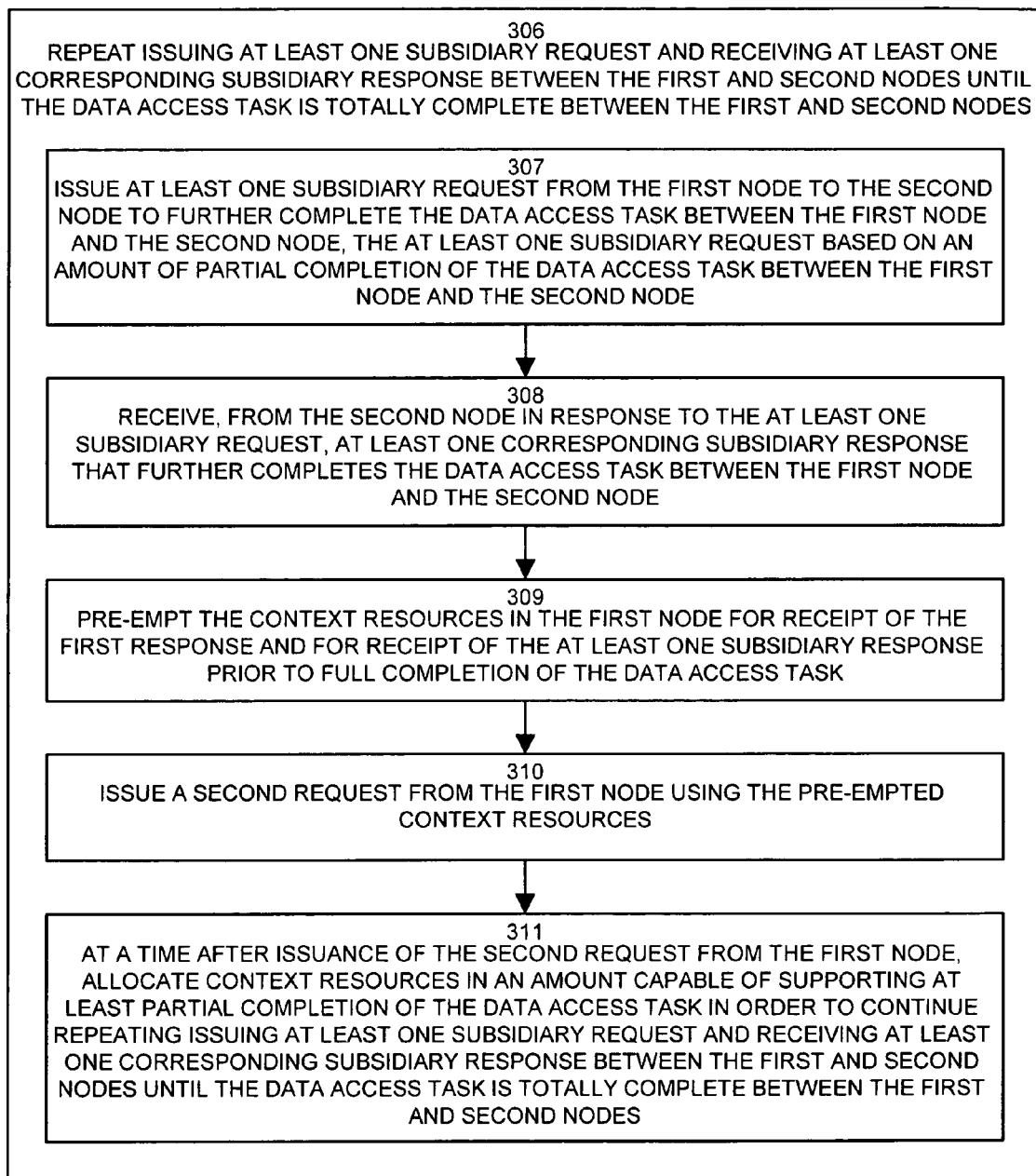
Figure 6:
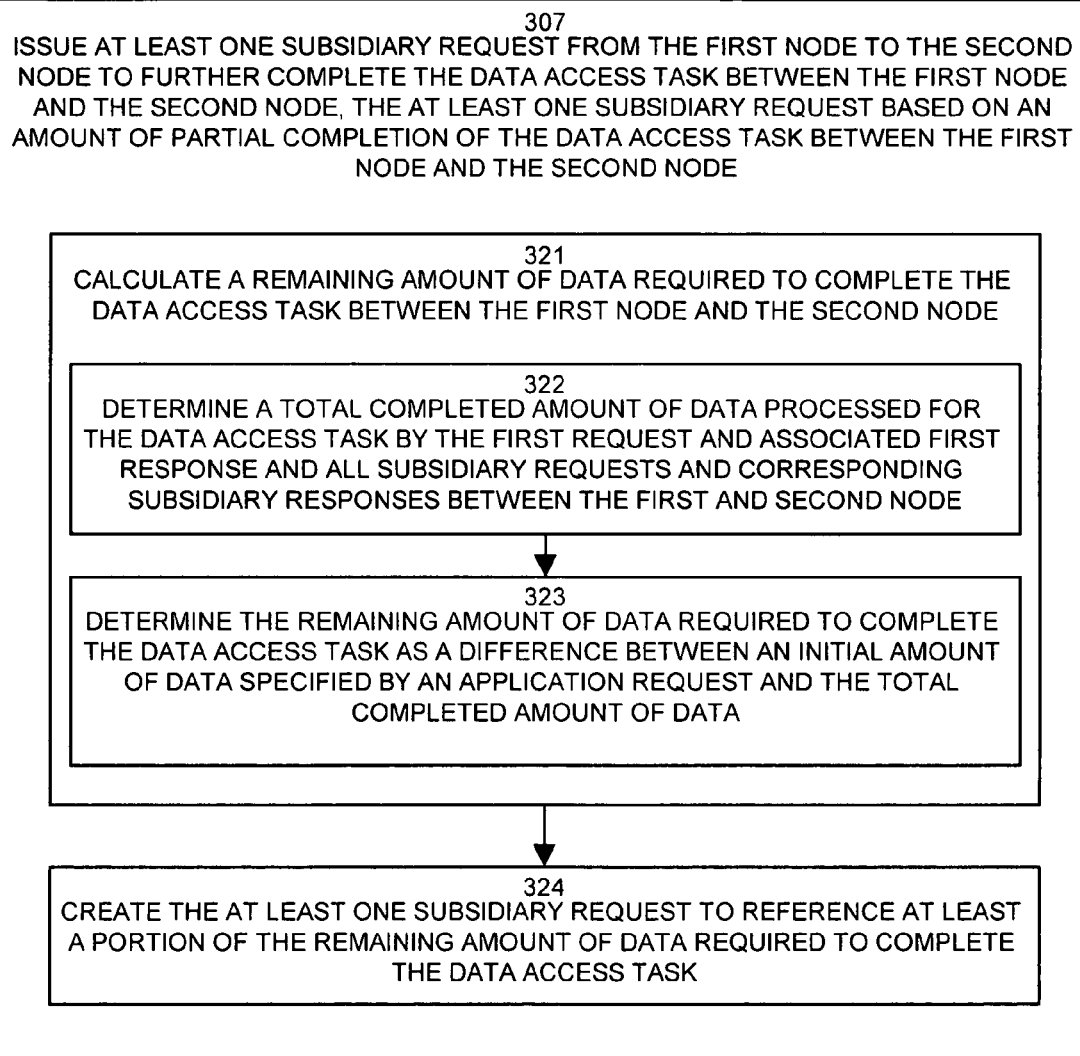

FIGS. 4 through 6 provide a flow chart of processing steps or operations that illustrate a more detailed operation of a communications interface such as an Infiniband channel adapter configured to operate in accordance with example embodiments of the invention. Generally, the processing steps in the flow chart in FIGS. 4 through 6 will be explained with respect to being performed by the communications interface process 221 shown in FIG. 3 during operation.

In step 300, the communications interface process 221 establishes a common data allotment 119 between itself and other nodes (e.g., second node 120) as a maximum amount of data to be used when responding to requests to transfer a remaining amount of data between the nodes (i.e., 110 and 120), such that if a total amount of data to be transferred between the first node 110 and the second node 120 (e.g., as specified by an application request 115) is greater than the data allotment 119, the second node 120 provides the first response 151 and at least one subsidiary response 153-1 through 153-X that contain(s) response data that does not exceed the data allotment 119. In this manner, step 300 serves as an initialization step so that two nodes 110 and 120 can agree upon an amount of data (the data allotment 119) by which to limit data transfers, regardless of how much data is requested.

As shown in sub-step 300-1, in one embodiment of the invention, the communications interface process 221 can dynamically determine the data allotment 119 between the first and second nodes 110 and 120 based on at least an external data allotment event 380, such that if an external data allotment event 380 occurs, the first and second nodes change a value of the data allotment 119 in agreement with each other. One example of an external data allotment event 380 would be a systems administrator or communications interface installer initially configuring the communications interface 112 with a predetermined or preset value for the data allotment 119. It is to be understood that in addition to or instead of dynamic data allotment determination, the data allotment determination can be performed statically at the time the nodes are initialized (e.g., booted). In such cases, two nodes 110 and 120 can negotiate to an agreed upon data allotment, or both nodes may be preprogrammed with a predetermined data allotment value (e.g., configured by the manufacturer).

As an example, the communications interface process 221 can operate a data allotment deamon or monitoring process such as the context manager 116 that can periodically update and change the value of the data allotment 119 based on various criteria such as current bandwidth of the interconnection fabric 102 or based on processing load or capacity of the communications interface is 112 and 122 between two nodes 110 and 120 that the technique to perform data transfers. In other words, in one embodiment of the invention the data allotment value 119 is fixed in nature and once set does not change during typical operations of the communications interface 112.

Alternatively, in other embodiments of the invention the communications interface process 221 can periodically adjust or change the data allotment value 119 in unison with other nodes (e.g., node 120) at either present times (e.g., based on time of day) or in response to an external stimulus such as current processor loads of each node, network bandwidth, node availability, congestion conditions in the interconnection 102, time of day, day of week, average request size over a period of time, request patterns or past request history of a particular data communications application 111 or other factors. In this manner, embodiments of the invention allow the communications interface process 221 to modify the value of the data allotment 119 based on one or more criteria.

As a specific example, if a particular data communications application 111 has a previous history as tracked by the communications interface 112 of issuing many very large data access requests (e.g., frequent 2 GB requests) to a particular second node 120 within an Infiniband network interconnection fabric 102, then when the first node 110 launches, runs or otherwise executes this particular data communications application 111, the communications interface process 221 can detect this condition or criteria and can communicate with the second node 110 in order to optimally adjust the data allotment values 119 in each of these nodes 110 and 120 so that forthcoming large data transfers performed by that data communications application 111 will not significantly overburden the communications interface 112 or tie up context resources 113 in either the first or the second node 120. Once the value for the data allotment 119 is specified, processing can proceed according to embodiments of the invention to process application requests 115 within request queues 114 associated with communications applications 111.

In step 301, the communications interface process 221 detects an application request 115 in a request queue 114. The application request 115 identifies a data access task to be performed between the first and second nodes 110 and 120. In one embodiment, the application request 115 is a work queue entry identifying a remote direct memory access request for the first node 110 to access data in a memory 121 at the second node 120. The initial amount of data specified by the application request 115 is a total amount of data that the first node 110 is to access in the memory 121 at the second node 120. The application request 115 may be, for example, an RDMA read request requesting as much as 2 GB of data to be read from memory associated with the second node 120, or may be a request for a somewhat smaller amount of data, but still significantly larger than twenty KB.

In step 302, based on the application request 115, the communications interface process 221 causes the first node 110 to issue a first request 150 to the second node 120. The first request 150 requests that a data access task (e.g., read 2 GB) be performed between the first node and the second node 110 and 120.

In step 304, the communications interface process 221 allocates context resources 113 in the first node 110 for receipt of the first response 151 (also to be used for receipt of at least one subsidiary response 153-1). The communications interface process 221 allocates the context resources 113 to service a response to the request (issued in step 302) that will be received in an amount not exceeding the data allotment 119. Allocation of the context resources 113 supports at least partial completion of the data access task. In other words, if the data allotment is 20 KB, in step 304, the communications interface process 221 allocates context resources to handle 20 KB first and subsidiary responses 151 and 153. Note that those context resources may be pre-empted, as will be explained, after a request response sequence is complete and prior to total completion of the data access task specified by the initial request 115.

In step 305, the first node 110 receives a first response 151 from the second node 120 that partially completes the data access task specified by the application request 115. As explained above, the first response 151 is limited in size (e.g., 20 kB) to the amount of data specified by the data allotment 119 that the communications interface 122 uses to prepare (i.e., create) and issue the response to the second node 120. After processing step 305 is complete processing proceeds to step 306 at the top of the flow chart shown in FIG. 5.

FIG. 5 is a flow chart of processing steps that continues from processing step 305 in FIG. 4.

In step 306 in FIG. 5, the communications interface process 221 repeats the processing operations of issuing at least one subsidiary request 152 and receiving at least one corresponding subsidiary response 153 between the first and second nodes 110 and 120 until the data access task is totally complete between the first and second nodes 110 and 120. In other words, in step 306 and its associated sub-steps 307 through 311, the communications interface process 221 issues successive subsidiary requests 152 that each request at least a portion of the data specified by the application request 115. In one embodiment, a subsidiary request 152-X+1 is issued after receipt of a former requests 152-X corresponding subsidiary response 153-X. Each corresponding subsidiary response 153 provides data for partial completion of the data access task associated with or specified by the application request 115 (i.e., to obtain 2 GB of data in this example) by providing a response 153 that contains data in an amount specified by the data allotment 119 (e.g., a 20 kB response).

Sub-steps 307 through 311 illustrates processing operations performed according to one example embodiment of the invention in order to fully complete the data access task specified by the application request 115 using a series of subsidiary requests 152 followed by corresponding subsidiary responses 153.

In step 307, the communications interface process 221 in the first node 110 issues a subsidiary request 152 from the first node 110 to the second node 120 to further complete the data access task between the first node and the second node. The subsidiary request 152 requests access (e.g., read) to data in the second node 120 based on an amount of partial completion of the data access task that has occurred thus far between the first node and the second node for all requests and responses.

In step 308, the communications interface process 221 in the first node 110 receives, from the second node 120, in response to the subsidiary request 152, a corresponding subsidiary response 153 (e.g., a 20 KB response) that further completes the data access task (e.g., read 2 GB) between the first node 110 and the second node 120. This processing can be repeated until either the data access task is complete, or the context manager 116 pre-empts the context resources. That is, the context manager 116 in a communications interface 112 configured in accordance with one embodiment of the invention is capable of preempting context resources 113 prior to completion of the entire sequence of request and responses required to totally fulfill or complete a particular original data access task (e.g., RDMA read of 2 GB of data) associated with the initial application request 115.

In step 309, in this example, after completion of receipt of one subsidiary response 153 in a sequence of requests 152 and responses 153, the communications interface process 221 in the first node 110, and specifically the context manager 116, pre-empts the context resources 113 in the first node (i.e., currently allocated for receipt of the first response 151 and for receipt of the subsidiary responses 153) prior to full completion of the data access task specified by the application request 115. That is, during the processing of sequences of subsidiary requests 152 followed by receipt of subsidiary responses 153, each request response sequence is considered a separate subsidiary data access task and the context manager 116 can perform interruption and preemption of context resources 113 previously allocated to perform the sequence of request and responses to allow those context resources 113 to be used, for example, to service other requests within other request cues 114. Generally, the context resources 113 represent work queue item processing resources and state information associated with processing an initial request 115.

As an example of preemption, if the application request 115 indicates a data access task to read 2 GB of data from the memory system 121 from the second node 120, and each request 150 and 152 requests completion of a portion of this task (or a request may request completion of all of the task, but beginning at an offset incremented by the total amount of data received thus far) and each response 151 and 152 returns only a twenty (20) KB portion (as defined by the data allotment 119) of data to partially complete the application request 115, the context manager 116 can periodically release or pre-empt the context resources 113 allocated to service this series of incoming 20 KB responses 151 and 153 for use in servicing other request queues 114 for other applications in the node 110 at any time after complete reception of a particular response 153 associated with a subsidiary request 152. In this manner, since it may take many (e.g., hundreds or thousands of) subsidiary request and response sequences to complete a large data access task such as reading 2 GB of memory in 20 KB increments by breaking down this original data access task into subsidiary request and response sequences, context resources 113 do not have to be continuously allocated for the entire period of time required to perform the entire number of request and response sequence associated with full completion of the original data access task specified by the application request 115. Instead, embodiments of the invention allow preemption of those context resources 113 at the end of completion of any subsidiary request response pair, such that the context manager 116 can reallocate those context resources to periodically service other request queues 114.

Preemption of context resources 113 that are servicing large data access tasks specified in a request 115 in a request queue (e.g., a send queue in an Infiniband queue pair, ensures that fairness and quality of service is maintained within the communications interface 112 with respect to serving the data transfer needs of other data communications applications that may require data transfer capability besides the data communications application 111. During the period of preemption of the context resources 113, those resources 113 can be used to process other requests that may be present, for example, within other request queues 114 associated with those other applications. This provides for fairness in the use of link bandwidth between nodes since embodiments of the invention break large data access requests into sequences or smaller request response pairs from which context resources can be pre-empted. According, large data access requests do not tie up or allocate a particular set of context resources used to receive a response for extended periods of time. Since it may take a considerable amount of time to receive, for example, and entire 2 GB block of data, by breaking this initial read request data access task into smaller request/response sequences limited in size by the data allotment (e.g., 20 KB), and allowing the context manager to preempt Infiniband context resources used to service a queue pair containing such a large initial data access task, embodiments of the invention do not allow large data access tasks to starve other queue pairs for access to a limited supply of context resources.

Specifically, in step 310, the communications interface process 221 in the first node 110 issues a second request 155 from the first node 110 using the pre-empted context resources 113-1. In one embodiment of the invention, the second request 155 can be a different type of data access request that the application request. As an example, if the first request and series of subsidiary requests associated with the application request 115 were RDMA read requests, the second request 155 may be, for example, an RDMA write or read request, or any other type of request that may arrive for processing within the request queue 114. In addition, in one embodiment of the invention, the communications interface process 221 in the first node 110 can issue the second request 155 from the first node to a different node than the second node 120.

It is to be understood then that once the context manager 116 preempts the context resources 113 for handling the sequence of subsidiary requests 152 and receipt of subsidiary responses 153, the communications interface 112 can utilize those context resources 113 for any other type of request in any other request queue 114 to any other node (or to the same node as the application request 115 was directed from which those resources were preempted). Thus, the preempted context resources can handle requests 115 from other request queues 114 of the same or a different type and to the same or different node as the preempted request 115, since request type and designation/responder node identification are different parameters of an initial request in an architecture such as Infiniband.

During the preemption operation, the current state of the context resources 113 including information related to the current sequencing of subsidiary requests and responses as tracked by the task manager 118 for that particular request queue 114 is saved such that when the context manager 116 reschedules a context resource 113 to continue servicing the application request 115 (i.e., to further complete or to finish the data access task associated with the application request 115), the task manager 118 can retrieve and reinstate the former context state of the preempted context resources 113-1 for completion of the original data access task associated with the application request 115. In other words, when reassigning a context resource 113 to handle the formerly preempted data access task, assigned context resource 113 can re-load the save context state and can continue where the preemption interruption left off to complete the transfer of the remaining amount of data.

To do so, in step 311, at a time after issuance of the second request 155 from the first node, the communications interface process 221 in the first node 110 again begins to service further completion of the original data access task associated with the application request 115 and again allocates (i.e., reallocates or reassigns) context resources 113 to support receipt of responses that support at least partial completion of the original data access task (i.e., in order to continue repeating issuing at least one subsidiary request 152 and receiving at least one corresponding subsidiary response 152 between the first and second nodes 110 and 120 until the data access task is totally complete between the first and second nodes). Note that for a large data access task specified by an application request 115, such as requesting 2 GB of data to be read for memory in another node, there may be more than one preemption sequence prior to total completion of the original data access task.

In this manner, embodiments of the invention operate to reduce or breakdown an initial or application request 115 for a particular data access task such as a remote direct memory access read request between Infiniband nodes into a series of requests and responses such that each response retrieves or returns a portion of data associated with the data access task specified by the application request 115. Each response is limited by the data allotment 119 value specifying a pre-agreed amount of total data to be transferred between two Infiniband nodes in single response to any data access request. By governing the size of the responses to read requests in particular, embodiments of the invention avoid bottleneck situations and each application having pending requests in an associated queue pair is fairly treated, regardless of how big or small an amount of data is requested.

It is to be understood that the invention can be used for write requests as well. However, a programmer of an application can be aware of link usage and fairness issues related to transferring large blocks of data and may configure or otherwise program an application to break up a requirement to write a single large block of data into a number of smaller sized write requests. It is to be understood that the data allotment 119 can be used to limit the size of any data transfers between nodes and can be applied equally well to Infiniband RDMA write commands as well as RDMA read commands. Thus in the aforementioned example, the data access task is an RDMA read requests. Embodiments of the invention however are not limited to this type of data access task and can be applied to other data access task such as write requests or others types of requests available in other interconnect architectures besides Infiniband, as may be required.

In addition, embodiments of the invention as explained above indicate that the first and second node 110 and 120 agree upon a single data allotment value 119. This is illustrated by way of example only and other embodiments of the invention provide a communications interface process that can maintain a set of separate respective data allotment values 119 for different nodes with which that communications interface process 112 performs data transfers. In other words, the aforementioned example illustrates the first node 110 that includes a pre-agreed upon data allotment value 119 with respect to a second node 120. In other embodiments of the invention, the first node 110 may maintain multiple data allotment values 119-1 through 119-W (not specifically shown in FIG. 1) such that each respective data allotment value 119 defines a particular total amount of response data that can be received or sent (if the first node is the requesting node) or that may be transferred (if the first node is a responding node) for other particular nodes 120-2 through 120-W existing within an Infiniband interconnection fabric 102. In this manner, the first node may perform the breakup of an application request into smaller subsidiary request and response sequences using a certain value for the responses when communicating with one node while using a different sized response value when communicating with another node.

In the aforementioned discussion of embodiments of the invention, the task manager 118 within a particular context resource 113 is responsible for tracking or calculating the current amount of total data received thus far for a series of request and response sequences associated with the particular application request 115 being serviced by the sequence. In other words, the task manager 118 is capable of calculating the current state of receipt and total amount of data obtained from all received subsidiary requests and response sequences 152 and 153 and is able to formulate or calculate each successive subsidiary request to request memory at a proper offset or address into the original amount of data requested by the application request 115, based upon the total summation of all amounts data received thus far from all first and subsidiary responses 151 and 153. Particular details of the processing associated with the task manager 118 will now be discussed with respect to the flow chart of processing steps illustrated in FIG. 6 which shows details associated with issuing subsidiary requests 152 and receiving corresponding subsidiary responses 153.

FIG. 6 is a flow chart of processing steps that illustrates processing details of step 307 above in which the communications interface process 221 in the first node 110 issues a subsidiary request 152 and uses the task manager 118 to calculate each request 152.

In step 321, the communications interface process 221 in the first node 110, and specifically the task manager 118 operating the context resources 113, calculates a remaining amount of data required to complete the data access task (i.e., of the application request 115) between the first node 110 and the second node 120.

To do so, in sub-step 322, the task manager 118 determines a total completed amount of data processed for the data access task by the first request 150 and associated first response 151 and all subsidiary requests 152 and corresponding subsidiary responses 153 completed thus far between the first and second nodes 110 and 120.

In sub-step 323, the task manager 118 determines the remaining amount of data required to complete the data access task as a difference between an initial amount of data specified by the initial application request 115 and the total completed amount of data (for the entire set of completed request and response sequences completed thus far).

In step 324, the task manager 118 creates the subsidiary request 152 to reference at least a portion of the remaining amount of data required to complete the data access task.

In this embodiment then, each subsidiary request 152 requests data beginning at an offset into the entire block of data requested by the application request 115. The task manager 118 determines this offset by calculating the summation of the total amount of data received by the first response 151 and all subsidiary responses 152 received and completed thus far and add this value to the original address to get the new beginning offset for the next subsidiary request. As an example, assuming a 20 kB data allotment value 119 agreed upon between the first node 110 and the second node 120, if the application request 115 identifies a data access task to read 2 GB of memory 121 from the second node 120, the first request and first response sequence 150 and 151 will cause the context resource 113-1 to acquire the first 20 kB of the entire 2 GB block of data. Upon formulating the first subsidiary request 152-1, the task manager 118 can proceed in a variety of ways as explained above to calculate where within the entire 2 GB block of data, the next subsidiary request should request to being further reading of data.

As an example, in one embodiment of the invention, the task manager 118 can keep track of the total number of first and subsidiary responses 151 and 153 received thus far and can multiply this value by the data allotment value 119 in order to compute the total amount of data received thus far. Using this information, the task manager 118 can add this value to the starting address of the memory block to be read as specified within the application request 115 in order to produce a new starting address or offset for the next subsidiary request 152.

Alternatively, the task manager 118 can keep a running total of the entire byte count of all data received thus far for all responses 151 and 153. Using this total byte count, the task manager 118 can calculate a remaining amount of data to be read up to this point in time by subtracting the total amount of data received from the total amount of requested data specified by the application request 115. This new value of data can be requested in each subsidiary request 153 beginning at an address or offset calculated as explained above. In this manner, each subsidiary request 152 requests a smaller and smaller amount of data beginning at an offset into the application requested data block as determined by the total amount data received for all request in response sequences received thus far the communications interface 112.

The task manager 118 maintains a state associated with the current completion of the original data access task specified by the application request 115 and this state information is used to compute each subsidiary request. A responding or second node 120 responds to each request by only providing data in an amount specified or limited by the data allotment 119, even if each subsidiary request requests more than this amount of data. Since the task manager 118 essentially tracks where in the current block of data each subsidiary read request is taking place (and can track the corresponding returned data), the task manager 118 can determine when the entire original data access task is complete by recognizing when calculation of the next subsidiary request of the requesting data beyond the end of the application requested data block specified by the application request 115. In the event of preemption, the values for such information as a current offset and data amounts received thus far, as maintained by the task manager 118, can be saved for this request queue 114, such that when context resources are preempted, this information can be saved and when the context resources 113 are again allocated for completion of the in-progress partially completed initial request 115, this saved state information can be read by the newly assigned context 113 on order to allow the task manager 118 to begin where it left off in servicing the initial request 115.

In this manner, embodiments of the invention promote fairness and quality of service in situations where multiple data communications applications 111 are contending for a limited set of context resources 113 that service may queue pairs 114 within the communications interface 112 such as an Infiniband channel adapter. Accordingly, large memory access requests such as RDMA read requests for large blocks of memory can be fairly apportioned or spread out over time so as not to consume context resources 113 for extended periods of time during the processing of such data transfers.

From the aforementioned discussion, it is to be understood that embodiments of the invention implement unique mechanisms and techniques for processing data access requests in an interconnection architecture such as Infiniband. Those skilled in the art will understand that there can be many variations made to the embodiments explained above while still achieving the same objective of those embodiments and the invention in general. As an example, the specific processing steps discussed above can be rearranged in different orders while still achieving the same overall result as provided by embodiments of the invention. Accordingly, embodiments of the invention are not intended to be limiting to the aforementioned discussion and equivalents to the aforementioned processing steps are intended to be included as embodiments of the invention.

What is claimed is:

1. A method for performing remote access commands between nodes, the method comprising:

establishing a mutually pre-agreed upon data allotment for a first node and a second node;

detecting an application request in a request queue of the first node, the application request identifying a data access task to be performed between the first node and the second node, wherein the application request is a remote direct memory access (RDMA) request for the first node to access data in a memory at the second node and wherein the first node and the second node exchange requests and responses to perform the data access task via a first channel adapter at the first node and a second channel adapter at the second node; and assigning a context including a set of channel adapter resources of the first node to process the application request to completion of the data access task, the context operating a task manager that tracks an offset for the data access task, wherein the set of channel adapter resources are hardware resources within the first channel adapter of the first node;

issuing a first request from the first node to the second node, the first request requesting the data access task be performed between the first node and the second node;

receiving, at the first node, a first response from the second node that partially completes the data access task and that contains a first amount of data not exceeding the data allotment;

issuing at least one subsidiary request from the first node to the second node to further complete the data access task between the first node and the second node, the at least one subsidiary request based on an amount of partial completion of the data access task between the first node and the second node; and receiving, from the second node in response to the at least one subsidiary request, at least one subsidiary response that further completes the data access task between the first node and the second node and that contains a second amount of data not exceeding the data allotment;

wherein a new starting value for subsidiary data to be transferred for each of the at least one subsidiary request is calculated from the offset; and wherein the context is pre-empted between the first response and a first subsidiary request, and between a subsidiary response and a subsequent subsidiary request, wherein the pre-empted context is available to be assigned to other data access tasks by the first channel adapter performing a context switch from the data access task to another data access task of the other data access tasks.

2. The method of claim 1, further comprising:

pre-empting the context prior to the completion of the data access task;

issuing a second request from the first node to the second node for the other data access task; and resuming the context for the other data access task.

3. The method of claim 2, wherein the other data access task is identified by a different application request in a different request queue.

4. The method of claim 1, wherein the step of issuing the at least one subsidiary request comprises:

calculating a remaining amount of data required to complete the data access task between the first node and the second node; and creating the at least one subsidiary request for the remaining amount of data required to complete the data access task.

5. The method of claim 4, wherein the step of calculating the remaining amount of data comprises:

determining a total completed amount of data processed for the data access task by the first request and the first response and the at least one subsidiary request and the at least one subsidiary response between the first node and the second node; and determining the remaining amount of data required to complete the data access task as a difference between an initial amount of data specified by the application request and the total completed amount of data.

6. The method of claim 1, wherein:

the initial amount of data specified by the application request is a total amount of data that the first node is to access in the memory at the second node.

7. The method of claim 6, wherein the first request and the at least one subsidiary request are read RDMA commands issued by the first node to the second node.

8. The method of claim 1, wherein the step of establishing the data allotment comprises:

dynamically determining the data allotment between the first node and the second node based on at least one external data allotment event, wherein if the at least one external data allotment event occurs, the first node and the second node change the data allotment.

9. A first device including a channel adapter, the channel adapter comprising:

a processor within the channel adapter;

a memory coupled to the processor; and a communications port coupled to the processor and the memory;

wherein the processor executes channel adapter codes stored in the memory to perform remote access commands between the first device and a second device by performing the steps of:

establishing a mutually pre-agreed upon data allotment for the first device and the second device;

detecting an application request in a request queue of the first device, the application request identifying a data access task to be performed between the first device and the second device, wherein the application request is a remote direct memory access (RDMA) request for the first device to access data in another memory at the second device and wherein the first device and the second device exchange requests and responses to perform the data access task via the channel adapter of the first device and another channel adapter at the second device; and assigning a context including a set of channel adapter resources of the first device to process the application request to completion of the data access task, the context operating a task manager that tracks an offset for the data access task, wherein the set of channel adapter resources are hardware resources within the channel adapter of the first device;

issuing a first request from the first device to the second device, the first request requesting the data access task be performed between the first device and the second device;

receiving, at the first device, a first response from the second device that partially completes the data access task and that contains a first amount of data not exceeding the data allotment;

issuing at least one subsidiary request from the first device to the second device to further complete the data access task between the first device and the second device, the at least one subsidiary request based on an amount of partial completion of the data access task between the first device and the second device; and receiving, from the second device in response to the at least one subsidiary request, at least one subsidiary response that further completes the data access task between the first device and the second device and that contains a second amount of data not exceeding the data allotment;

wherein a new starting value for subsidiary data to be transferred for each of the at least one subsidiary request is calculated from the offset; and wherein the context is pre-empted between the first response and a first subsidiary request, and between a subsidiary response and a subsequent subsidiary request, wherein the pre-empted context is available to be assigned to other access tasks by the channel adapter performing a context switch from the data access task to another data access task of the other data access tasks.

10. The first device of claim 9, wherein the processor further executes the channel adapter codes to perform the further steps of:

pre-empting the context prior to the completion of the data access task;

issuing a second request from the first device to the second device for the other data access task; and resuming the context for the other data access task.

11. The first device of claim 10, wherein the other data access task is identified by a different application request in a different request queue.

12. The first device of claim 9, wherein the step of issuing the at least one subsidiary request comprises:

calculating a remaining amount of data required to complete the data access task between the first device and the second device; and creating the at least one subsidiary request for the remaining amount of data required to complete the data access task.

13. The first device of claim 12, wherein the step of calculating the remaining amount of data comprises:

determining a total completed amount of data processed for the data access task by the first request and the first response and the at least one subsidiary request and the at least one subsidiary response between the first and second device; and determining the remaining amount of data required to complete the data access task as a difference between an initial amount of data specified by the application request and the total completed amount of data.

14. The first device of claim 9, wherein:

the initial amount of data specified by the application request is a total amount of data that the first device is to access in the other memory at the second device.

15. The first device of claim 14, wherein the first request and the at least one subsidiary request are RDMA commands issued by the first device to the second device.

16. The first device of claim 9, wherein the step of establishing the data allotment comprises:

dynamically determining the data allotment between the first device and the second device based on at least one external data allotment event, wherein if the at least one external data allotment event occurs, the first device and the second device change the data allotment.

* * * * *